US011283809B2

(12) United States Patent
Bogdanich Espina et al.

(10) Patent No.: US 11,283,809 B2
(45) Date of Patent: Mar. 22, 2022

(54) AUTOMATIC REDUCTION OF PRIVILEGE ROLE ASSIGNMENTS

(71) Applicant: MICROSOFT TECHNOLOGY LICENSING, LLC., Redmond, WA (US)

(72) Inventors: Vera Bogdanich Espina, Buenos Aires (AR); Nicholas Patrick Brown, Seattle, WA (US); Varun Sharma, Sammamish, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 269 days.

(21) Appl. No.: 16/540,526

(22) Filed: Aug. 14, 2019

(65) Prior Publication Data

US 2021/0051153 A1   Feb. 18, 2021

(51) Int. Cl.
*H04L 29/06* (2006.01)

(52) U.S. Cl.
CPC .......... *H04L 63/104* (2013.01); *H04L 63/105* (2013.01); *H04L 63/20* (2013.01)

(58) Field of Classification Search
CPC ..... H04L 63/104; H04L 63/105; H04L 63/20; G06F 9/46; G06F 2221/2141; G06F 21/45
USPC ......................................................... 726/27
See application file for complete search history.

(56) References Cited

U.S. PATENT DOCUMENTS

| 9,774,586 | B1* | 9/2017 | Roche ................. G06F 21/6218 |
| 10,148,701 | B1* | 12/2018 | Hecht ..................... G06F 9/455 |
| 2015/0271200 | A1* | 9/2015 | Brady ................ H04L 63/1416 726/4 |
| 2017/0086090 | A1* | 3/2017 | Sharma ............ H04W 28/0268 |
| 2020/0034788 | A1* | 1/2020 | Ynion, Jr. .............. G06Q 30/08 |

OTHER PUBLICATIONS

"E-Security Begins with Sound Security Policies", In Symantec Enterprise Security, Jun. 14, 2001, 23 Pages.
"International Search Report and Written Opinion Issued in PCT Application No. PCT/US20/037099", dated Sep. 14, 2020. 14 Pages.
Vimercati, et al.. "Access Control: Principles and Solutions", In Software: Practice and Experience, vol. 33, Issue 5, Apr. 25, 2003, pp. 397-421.
Lyon, et al., "Built-in-Roles for Azure Resource", Retrieved from https://docs.microsoft.com/en-us/azure/role-based-access-control/built-in-roles. Jun. 24, 2019, 116 Pages.
Lyon, et al., "What is Role-Based Access Control (RBAC) for Azure Resources", Retrieved from https://docs.microsoft.com/en-us/azure/role-based-access-control/overview, Jun. 12, 2019, 8 Pages.

* cited by examiner

*Primary Examiner* — Kambiz Zand
*Assistant Examiner* — Aubrey H Wyszynski (57) ABSTRACT

A least-privilege role is automatically assigned to a service principal in order to ensure that a service principal is able to perform actions on a resource of a subscription in a multi-tenant environment as intended without additional access and usage rights. The assignment of the least-privilege role is based on actions previously performed on the resources of a subscription by the service principal that match those actions within a role having the bare minimum permissions needed to perform those actions.

20 Claims, 6 Drawing Sheets

AUTOMATIC REDUCTION OF PRIVILEGE ROLE ASSIGNMENTS

BACKGROUND

The proliferation of the Internet has changed the workplace. An organization's Information Technology (IT) resources may be hosted on a cloud service which enables access from any location, from different types of applications (e.g., web-based application, mobile application, desktop application) and from different types of devices (e.g., mobile, Internet of Things (IoT), desktop, laptop, etc.). Although the cloud service provides increased productivity to the workplace, the complexity of the cloud service presents various kinds of security vulnerabilities that need to be overcome in order to protect the network resources.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A service principal is used by an automated tool, application and/or service to access and perform actions on a resource that is associated with a subscription of a tenant hosted in a cloud service. The service principal may have been configured with a role that enables the automated tool, application and/or service to perform certain actions on a resource that are not needed by the automated tool, application and/or service. The role of the service principal is adjusted to a least-privilege role in order to ensure that a role having the bare minimum permissions is assigned to the service principal.

The least-privilege role is determined by analyzing the historical usage of the actions performed on the resources in the subscription and by matching those actions with one or more roles having the bare minimum permissions to perform those actions. The least-privilege role may then be automatically assigned to the service principal.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

Aspects of the present invention address the automatic assignment of a least-privilege role to access a resource in a multi-tenant environment. A least-privilege role assignment ensures that resources hosted in a multi-tenant cloud service are accessed with the least-privileges or permissions needed to perform intended actions on a resource. In this manner, the resource is protected from security risks, such as data leakage and data loss. A least-privilege role is assigned to a service principal within a subscription with only those permissions needed to perform the actions previously made on the resource.

In one aspect, a cloud service hosts the resources of multiple tenants. A tenant is a directory that is associated with an enterprise, organization, group, user or entity that subscribes to the cloud service. A tenant contains resources, such as virtual machines, applications, application programming interfaces (APIs), storage accounts, services, etc. that are grouped into a subscription. A subscription is an object that represents a folder where the resources reside. A tenant may have many subscriptions.

The cloud service hosts the tenant's subscriptions and controls access to the resources contained within a subscription. A subscription may be fee-based or free and lasts for a designated length of time. Examples of a cloud service include without limitation, Microsoft Azure®, Google Cloud Platform™ service, iCloud®, and the like.

A resource is an entity that is managed by the cloud service, such as a virtual machine, virtual network, storage account, database, web-accessible application, and services. Resources belong to a resource group which is a logical grouping of the resources so that they can be managed as a single entity.

A service principal is an identity created for applications, hosted services, and automated tools to access resources. A service principal is authenticated before access is granted using either a password or a certificate. A service principal is given a role that controls its access to a resource instead of having the service principal log in with a user identity. A role indicates the privileges or permissions granted to a service principal to access and use a resource. A security risk may be created by granting a role with broad rights that exceed the rights needed for the service principal to perform its tasks. For example, providing the contributor role to a service principal by default allows unfettered access to a resource. In order to eliminate any potential security threats, the service principal is assigned the least-privilege role that provides the service principal with the permissions to accomplish its intended task without any additional privileges. This disclosure presents mechanisms to determine the least-privilege role for a service principal within a particular subscription.

Attention now turns to a further discussion of the system, devices, components, and methods utilized in an automated role assignment system.

System

Figure 1:
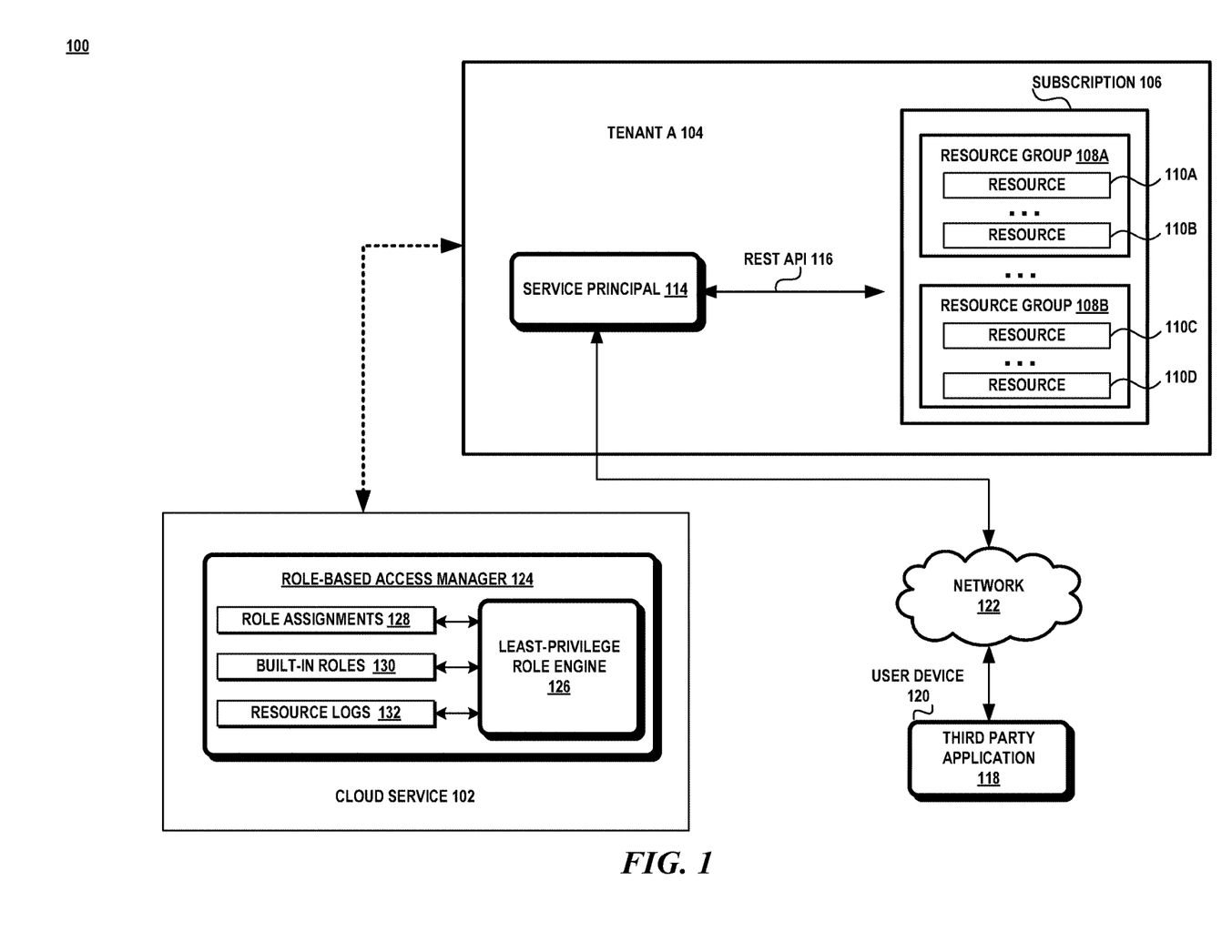
FIG. 1 illustrates an exemplary system to automatically determine the least-privilege role for a service principal within a subscription.

FIG. 1 illustrates a block diagram of an exemplary system 100 in which various aspects of the invention may be practiced. The system may be configured with a cloud service 102 that operates within a multi-tenant environment that serves multiple customers of the tenants. A cloud service 102 is a service available on demand for users through a publicly-accessible network, such as the Internet. A tenant may be an organization, entity, business unit within an organization, a group of users within an organization, and the like. A tenant hosts resources for use by its customers. As shown in FIG. 1, tenant A 104 contain subscription 106 having resource groups 108A, 108B where resource group 108A contains resources 110A-110B and resource group 108B contains resources 110C-110D.

A service principal 114 is an identity that represents an application, hosted service, and/or automated tool that accesses a resource 110. In one aspect, a service principal 114 may access a resource through a Representational State Transfer (REST) Application Programming Interface (API) 116. The application may be a third party application 118 hosted on a user device 120 that accesses a resource through a network 122, such as the Internet, using a service principal 114.

The cloud service 102 may contain a role-based access manager 124 that provides deployment and management services for the resources within a subscription. The role-based access manager 124 enables a user (i.e., organization, entity, tenant, etc.) to deploy, manage, and monitor its resources as a group and to control access to these resources. The role-based access manager 124 may include a least-privilege role engine 126, a role assignments file 128, a built-in roles files 130, and resource logs 132. The least-privilege role engine 126 determines the role having the least permissions needed for a service principal 114 to use and access a resource in a subscription.

The role-based access manager 124 manages the resources through an assignment of a role. A role is a set of permissions that identify actions or operations that may be performed on a resource. A role is assigned at a scope level. A scope is a logical grouping of resources within a hierarchical order. In one aspect, the hierarchical scope ordering includes, at the top level, a subscription 106 which includes one or more resource groups 108A, 108B, at a second level, with a resource group having one or more single resources 110A-110D, at the bottom level. A role may be assigned to all the resources of a subscription, to a single resource, or to all the resources of a resource group. The role assignments file 128 includes the role assignments that have been made in each subscription.

The built-in roles file 130 includes a list of the roles available within the cloud service 102 and the actions allowed and not allowed for each role. For example, in the Microsoft Azure® cloud service, there are seventy built-in roles. There are four commonly-used roles: Owner; Contributor; Reader; and User Access Admin. The role of an Owner has permissions that allow full access to all resources and the ability to grant access to others. There are no non-allowed actions. The role of Contributor has permissions that allow the security principal to create and manage all types of resources without the ability to grant access to resources to others. The role of a Reader has permissions to only read a resource. The role of a User Access Admin has permissions to manage user access to resources.

Other exemplary roles are: Classic Virtual Machine Contributor which allows a service principal to manage classic virtual machines without access to them or to the virtual network or storage account they are connected to; SQL Server Contributor allows for the management of SQL servers and databases without access to them or their security-related polices; and Data Purger allows for purging of analytic data.

A resource log 132 contains all the actions performed on a resource 110. A resource 110 writes an entry in the resource log 132 each time an access and use is made to the resource 110. There may be one resource log per subscription, per resource group or per resource. An entry in a resource log 132 may identify the subscription identifier, the resource group, and the actions performed on a particular resource. For example, an entry may be formatted as follows: /sub/subid/resourcegroup/RG1R2/read, where sub indicates subscription, subid indicates the subscription identifier, resourcegroup indicate resource group, RG1R2 indicates resource group 1 and resource 2, and read indicates that a read operation was performed on resource 2 in resource group 1 of subscription identifier subid.

It should be noted that FIG. 1 shows components of the system in one aspect of an environment in which various aspects of the invention may be practiced. However, the exact configuration of the components shown in FIG. 1 may not be required to practice the various aspects and variations in the configuration shown in FIG. 1 and the type of components may be made without departing from the spirit or scope of the invention. For example, this disclosure is not limited to a cloud service and may be practiced with any resource capable of being accessible through a network.

Methods.

Attention now turns to a description of the various exemplary methods that utilize the system and devices disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

In one aspect, the aim is to determine the least-privilege role that a service principal should have to perform its actions on the resources within a subscription that the service principal is authorized to access. The technique determines the privileges allowed by each role supported in the system and the actions that these privileges allow. This is no small task since there may be a hundred different roles supported by a cloud service.

Actions needed for the service principal to perform its tasks is determined from the historical usage of the actions performed on a resource within a subscription. The historical usage is obtained from actions logged by each resource in the subscription. The technique then maps the logged actions to a role having just the actions needed without any additional permissions.

Figure 2:
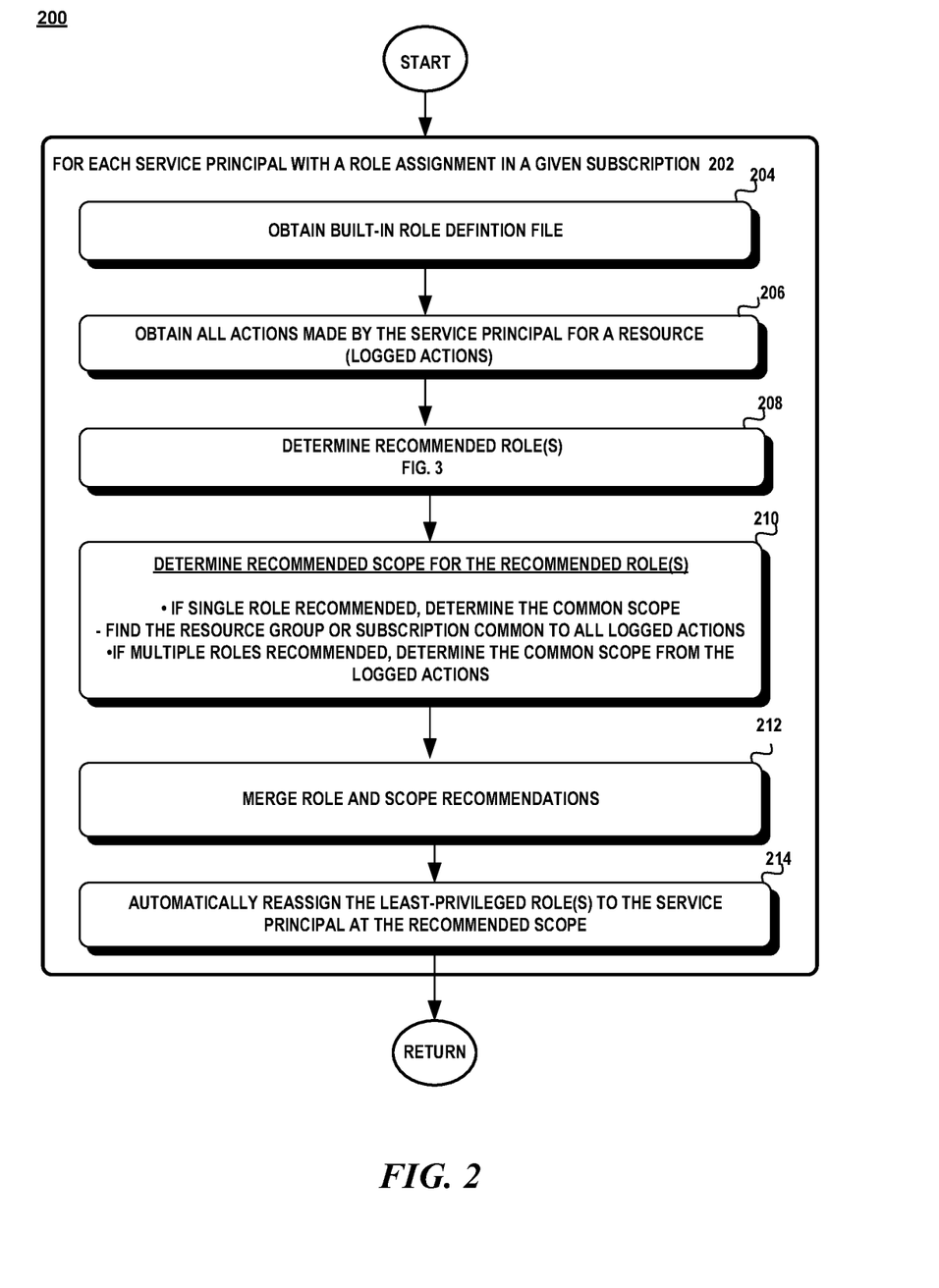
FIG. 2 is a flow diagram illustrating an exemplary method for determining the least-privilege role.

Turning to FIG. 2, there is an exemplary method 200 that iterates for each service principal with a role assignment in a given subscription (block 202). The role assignment file contains the identity of each service principal assigned a role within a subscription (block 202). In other aspects, the method may be initiated for a particular service principal, initiated to reassign roles for all service principals, initiated for a select group of service principals, and/or any combination of service principals (block 202).

The built-in role definition file is accessed (block 204). The built-in role definition file contains the roles within the system and the actions allowed and not allowed for each role. For example, as noted above, the role of a Classic Virtual Machine Contributor has an allowed action to manage classic virtual machines and does not give permissions to the classic virtual machines or to the virtual network or storage account they are connected to.

The actions that are performed by a service principal with the resources of a subscription are determined (block 206). The least-privilege role engine scans the resource log for each entry that pertains to the subscription identifier, subid, associated with a service principal. The resource log identifies a subscription using a subscription identifier. The entry in the resource log may identify the subscription identifier, the resource group, and the actions performed on a particular resource. For example, an entry may contain the following fields: . . . /sub/subid/resourcegroup/RG1R2/read, where sub indicates subscription, subid indicates the subscription identifier, resource group indicate resource group, RG1R2 indicates resource group 1 and resource 2, and read indicates that a read operation was performed on resource 2 in resource group 1 of subscription identifier subid. (Collectively, block 206).

The actions that are performed on each resource within the subscription identifier are collected (block 206) and grouped by the resource group in which they are performed (block 206). If the number of resource groups within the subscription exceeds a threshold, then the actions are grouped within the subscription (block 206).

Next, the recommended roles are generated (block 208). A recommended role is one that has privileges that enable the actions needed by the service principal. In some cases, there may a single role that contains the bare minimum privileges and in other cases, there may be more than one role.

Figure 3:
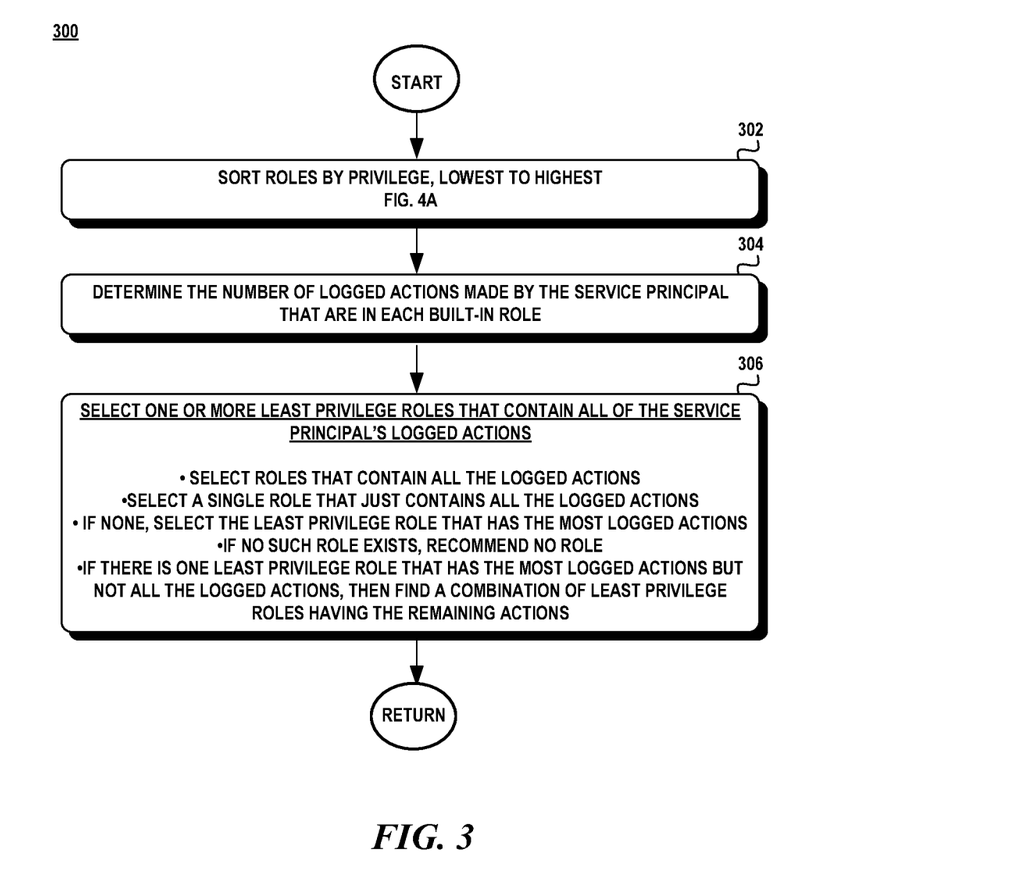
FIG. 3 is a flow diagram illustrating an exemplary method for recommending least-privilege roles suitable for a service principal within a subscription.
Figure 4A:
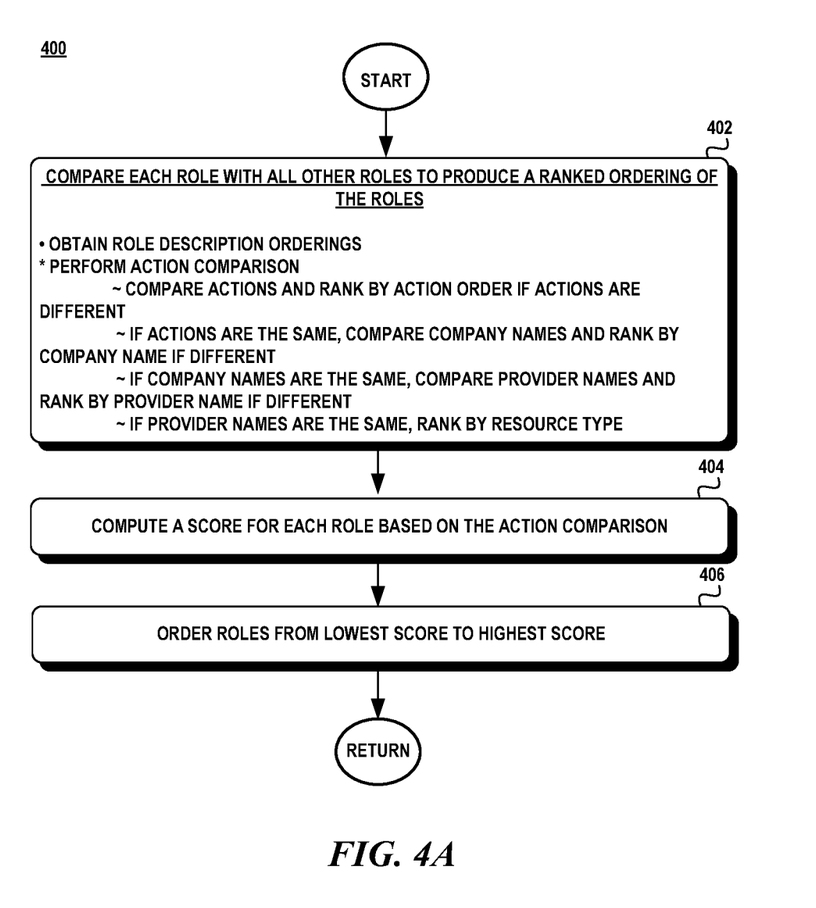
FIG. 4A is a flow diagram illustrating an exemplary method for sorting roles in ascending privilege order.

Turning to FIG. 3, in order to generate the recommended roles, the built-in roles are ordered based on a ranking of the actions allowed within a role (block 302). Turning to FIG. 4A, the privileges of each role is compared with the privileges of all other roles based on a comparison of the actions within each role. Pre-configured priority orderings are used in the action comparison (block 402).

In one aspect, a role description may include a company name, provider name, resource type and action. The description of the actions in a role may take the format COMPANY NAME.PROVIDER NAME/RESOURCE TYPE/ACTION TYPE. There is a priority ordering for the actions, the company names, the provider names, and the resource types. The action comparison compares the actions of two roles in accordance with the priority orderings. When the actions of two roles are compared, the action having the highest priority is given the highest rank. If the actions are the same, then the comparison is with respect to the company name field. The value in the company name field that has a company name takes priority over a wildcard (i.e., any/all companies). If the company names are the same, then the provider names are compared. The value in the provider name field takes priority over a value in the provider name field that is not a provider name. If the provider names are the same, then the resource types are compared. The resource type with the lowest priority is sorted higher than the resource type having a higher priority. (Collectively, block 402).

A score is computed for each role based on the action comparison (block 404). The score is the sum of the indices or positions of each role's action in the ranked action list (block 404). The score for each role is then used to rank the roles in the ranked role list (block 406).

Figure 4B:
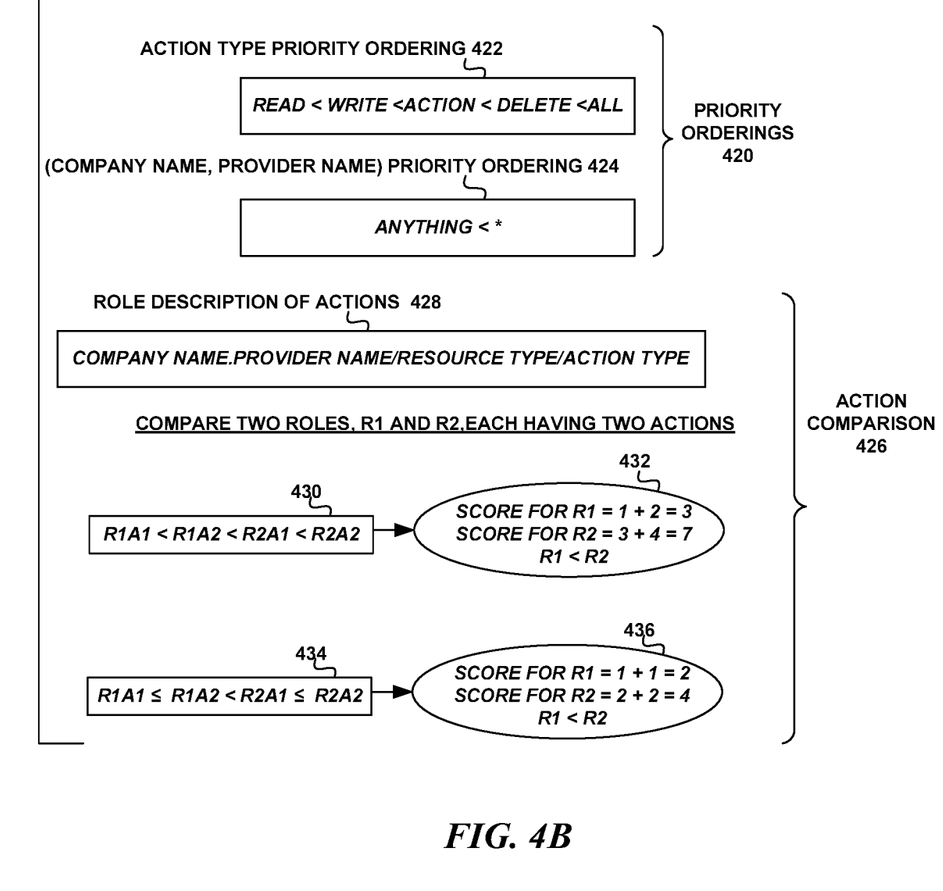
FIG. 4B is a schematic diagram illustrating an exemplary action comparison.

For example, as shown in FIG. 4B, the priority ordering for the action types 422 is, READ<WRITE<ACTION<DELETE<ALL, which shows that the highest priority action is ALL, followed by DELETE, followed by ACTION (e.g., VM WRITE, etc.), followed by WRITE, and the action with the least priority is READ.

If the comparison of two action types indicates a match, then the companies and/or providers are compared. A company name and a provider name have a lower priority over any other actions that use a wildcard (*). For example, the action */read indicates that the read action is allowed for all companies, providers and resources and this action type has priority over an action type that does not include a wild card and only a company name and/or provider name. Similarly, the action Microsoft.Compute/*/read allows read actions for all resource types for the Microsoft Compute provider and this action type has priority over action types that do not include a wild card. Hence, the action comparison at the company name and/or provider name gives a higher priority than a specified value: AnyCompanyName.AnyProviderName/AnyResourceType/AnyAction<*/AnyResourceType/AnyAction.

Two exemplary action comparisons 426 are shown in FIG. 4B where the actions in role R1 are compared with the actions in role R2. In the first case 430, the action comparison produced an ordering where R1A1 (action 1 in role 1) has the lowest rank, R1A2 (action 2 in role 1) has the second lowest rank, R2A1 (action 1 in role 2) has the second highest rank, and R2A2 (action 2 in role 2) has the highest rank. A score is computed for each role based on its action's location in the ranked order. Since the actions in role 1 are in the first and second lowest positions, the score for role 1 is the sum of position 1 and position 2 which is 3 (block 432). The score for role 2 is the sum of the positions of its actions which is the sum of positions 3 and 4 which is 7 (block 432). The roles are ranked based on the score which puts role, R1, as the least-privilege role and role, R2, as higher than role R1 (block 432).

Another exemplary action comparison 434 is shown where there are equally privileged actions. Action A2 in role 2 has the same privileges as action A1 in role 2 and action A2 in role 1 has the same privileges as action A1 of role 1. The score for role 1 is the sum of the lowest position taken twice, 1+1, which is 2 and the score for role 2 is the sum of the highest position taken twice, 2+2, which is 4 and the score for role 2 is 4. These scores put role 1 as the least-privilege role and role, R2, as higher than role R1. (Collectively, block 436).

Turning back to FIG. 3, when the roles are sorted by privilege, the number of logged actions that are made by the service principal in each role is determined (block 304). Then, the ordered role list is scanned from the lowest-privilege role for the role that has the most allowed actions (block 306). If one role has all the allowed actions of the service principal, then that role is selected as the recommended role (block 306). If no role exists that contains all the allowed actions, then the lowest-privilege role having the most allowed actions is selected and one or more additional low-privilege roles are selected to account for the remaining allowed actions (block 306). The recommended role may be a single role or a combination of roles.

Turning back to FIG. 2, a scope is selected for the recommended role or roles (block 210). A role is assigned at a scope level. A scope is a logical grouping of resources within a hierarchical order. In one aspect, the aim is to find a common scope for the recommended role or roles. The scope may be a resource group or a subscription. The logged actions for a security principal within a subscription are grouped and scanned for either a common resource group or subscription. For example, if the logged actions for a subscription are as follows: /subscription/SUB1/resourceGroups/RG1/Microsoft. Compute/vm1 /subscription/SUB1/resourceGroups/RG1/Microsoft.Compute/vm2 /subscription/SUB1/resourceGroups/RG1/Microsoft. Compute/vm3 then the common scope is /subscription/SUB1/resourceGroups/RG1/.

If the logged actions for an exemplary subscription are as follows: /subscription/SUB1/resourceGroups/RG1/Microsoft.Compute/vm1 /subscription/SUB1/resourceGroups/RG1/Microsoft. Compute/vm2 /subscription/SUB1/resourceGroups/RG2/Microsoft.Sql/sqlserver1 then the common scope is /subscription/SUB1/.

Turning back to FIG. 2, the recommended role or roles are merged with the recommended scope (block 212) so that the roles are applied at the recommended scope for the service principal (block 214).

Exemplary Operating Environment

Figure 5:
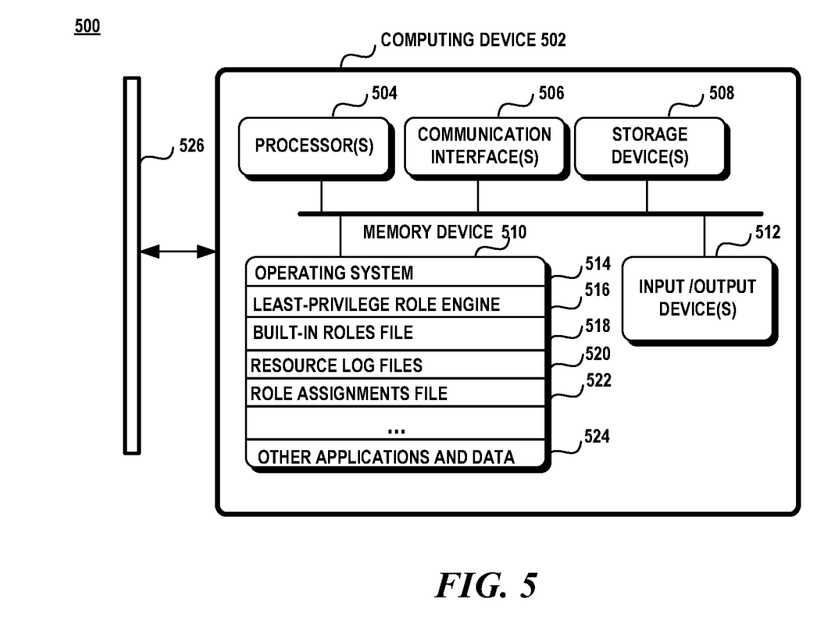
FIG. 5 is a block diagram illustrating an exemplary operating environment.

Attention now turns to a discussion of an exemplary operating environment. FIG. 5 illustrates an exemplary operating environment 500 in which one or more computing devices 502 are used to determine the least-privilege role for a service principal. However, it should be noted that the aspects disclosed herein is not constrained to any particular configuration of devices. Computing devices 502 may be configured as a cloud service that perform the security services for the cloud applications. It should be noted that the operating environment is not limited to any particular configuration and other configurations are possible.

A computing devices 502 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, an Internet-of-Things (IOT) device, a distributed computing system, multiprocessor systems, or combination thereof. The operating environment 500 may be configured in a network environment, a distributed environment, a multi-processor environment, or a stand-alone computing device having access to remote or local storage devices.

The computing device 502 may include one or more processors 504, one or more communication interfaces 506 one or more storage devices 508, one or more input/output devices 512, and a memory device 510. A processor 504 may be any commercially available or customized processor and may include dual microprocessors and multi-processor architectures. The communication interface 506 facilitates wired or wireless communications between the computing device 502 and other devices. A storage device 508 may be computer-readable medium that does not contain propagating signals, such as modulated data signals transmitted through a carrier wave. Examples of a storage device 508 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 508 in the computing device 502. The input/output devices 512 may include a keyboard, mouse, pen, voice input device, touch input device, display, speakers, printers, etc., and any combination thereof.

A memory 510 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory 510 may also include one or more external storage devices or remotely located storage devices that do not pertain to propagated signals, such as modulated data signals transmitted through a carrier wave. The memory 510 may include an operating system 514, a least-privilege role engine 516, built-in roles file 518, resource log files 520, role assignments file 522, and other applications and data 524.

The computing device 502 may be communicatively coupled to a network 526. The network 526 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

The network 526 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A system is disclosed having one or more processors, a memory, and one or more programs, wherein the one or more programs are stored in the memory and configured to be executed by the one or more processors. The one or more programs including instructions that: provide a service principal a first role, the first role having a permission that enables the service principal to perform an action on a first resource within a subscription; determine a set of actions previously performed on resources within the subscription; and reassign the service principal to a least-privilege role that has bare minimum permissions to facilitate the set of actions previously performed on the resources.

The one or more programs may include further instructions that obtain historical usage data of actions performed on the resources within the subscription to determine the set of actions. The one or more programs may include further instructions that order a plurality of roles provided by a cloud service associated with the subscription, the order based on permissions associated with each role of the plurality of roles, wherein the order is sorted by ascending permissions. The one or more programs may include further instructions that map the set of actions to at least one of the plurality of roles having permissions that only meet the set of actions. The one or more programs may include further instructions that associate a priority with each of the actions performed on the resources within the subscription and sort each role based on the associated action priority. The one or more programs may include further instructions that associate a scope to apply the least-privilege role. The application of the least-privilege role is applied to a scope common to the actions performed on the resources within the subscription.

A method is disclosed on a computing device having at least one processor coupled to a memory that comprises: providing a service principal with at least one permission to perform at least one action on at least one resource within a subscription, the subscription hosted in a multi-tenant service; tracking actions made on resources within the subscription; mapping the tracked actions to at least one least-privilege role having bare minimum permissions needed to perform the tracked actions; and assigning the least-privilege role to the service principal.

The method may further comprise determining a scope to associate with the least-privilege role, wherein the scope is associated with a grouping of resources within the subscription. The scope may be at a subscription level or at a resource group level. The method may further comprise sorting available roles in the multi-tenant service in ascending least-privilege order; and searching for the least-privilege role from the sorted available roles. The method may further comprise comparing actions within each role to determine a placement of a role within the ascending least-privilege order. The method may further comprise associating a priority to each type of action; and comparing the actions within each role using the action type priority. The method may further comprise computing a score based on the action comparison; and ordering the roles based on the score.

A device is disclosed comprising a processor coupled to a memory. The processor is configured to: assign a default role to a service principal to access a resource in a subscription of a tenant, the default role having a privilege that permits the service principal to perform at least one action on the resource; determine bare minimum permissions needed to perform past actions on the resource; find one or more least-privilege roles that cover the bare minimum permissions; and reassign the default role to the one or more least-privilege roles.

The processor may be further configured to compare each action in a first role with each action in a second role, wherein the action comparison is based on a priority ordering of a type associated with each action; and rank each action in the first role with each action in the second role based on the action type priority ordering. The processor may be further configured to: calculate a score for the first role based on a position of each action in the first role in the action type priority ordering; and calculate a score for the second role based on a position of each action in the second role in the action type priority ordering. The processor may be further configured to: sort the first role and the second role in a least-privilege order based on the score for the first role and the score for the second role. The processor is further configured to: apply the one or more least-privilege roles to a group of resources within the subscription. The one or more least-privilege roles may be applied to a scope common to the actions performed on the resources within the subscription.

What is claimed:

1. A system comprising:
   one or more processors; and a memory;
   one or more programs, wherein the one or more programs are stored in the memory and configured to be executed by the one or more processors, the one or more programs including instructions to perform actions that:
   provide a service principal a first role, the first role having a permission that enables the service principal to perform an action on a first resource within a subscription of a tenant of a cloud service, wherein the service principal is an identity created for software components to access resources of the cloud service;
   determine a set of actions previously performed on resources within the subscription; and
   reassign the service principal to a least-privilege role that has bare minimum permissions to facilitate the set of actions previously performed on the resources.

2. The system of claim 1, wherein the one or more programs include further instructions to perform actions that:
   obtain historical usage data of actions performed on the resources within the subscription to determine the set of actions.

3. The system of claim 2, wherein the one or more programs include further instructions to perform actions that:
   order a plurality of roles provided by the cloud service associated with the subscription, the order based on permissions associated with each role of the plurality of roles, wherein the order is sorted by ascending permissions.

4. The system of claim 3, wherein the one or more programs include further instructions to perform actions that:
   map the set of actions to at least one of the plurality of roles having permissions that only meet the set of actions.

5. The system of claim 4, wherein the one or more programs include further instructions to perform actions that:
   associate a priority with each of the actions performed on the resources within the subscription; and
   sort each role based on the associated action priority.

6. The system of claim 1, wherein the one or more programs include further instructions to perform actions that:
   associate a scope to apply the least-privilege role.

7. The system of claim 6, wherein the application of the least-privilege role is applied to a scope common to the actions performed on the resources within the subscription.

8. A method, comprising:
providing, at a computing device having at least one processor coupled to a memory, a service principal with at least one permission to perform at least one action on at least one resource within a subscription, the subscription hosted in a multi-tenant service, wherein the service principal is an identity created for software to access resources of the multi-tenant service;
tracking actions made on resources within the subscription;
mapping the tracked actions to at least one least-privilege role having bare minimum permissions needed to perform the tracked actions; and
assigning the least-privilege role to the service principal.

9. The method of claim 8, further comprising:
determining a scope to associate with the least-privilege role, wherein the scope is associated with a grouping of resources within the subscription.

10. The method of claim 9, wherein the scope is at a subscription level or at a resource group level.

11. The method of claim 8, further comprising:
sorting available roles in the multi-tenant service in ascending least-privilege order; and
searching for the least-privilege role from the sorted available roles.

12. The method of claim 11, further comprising:
comparing actions within each role to determine a placement of a role within the ascending least-privilege order.

13. The method of claim 12, further comprising:
associating a priority to each type of action; and
comparing the actions within each role using the action type priority.

14. The method of 13, further comprising:
computing a score based on the action comparison; and
ordering the roles based on the score.

15. A device, comprising:
a processor coupled to a memory;
wherein the processor is configured to perform actions that:
  assign a default role to a service principal to access a resource in a subscription of a tenant of a cloud service, the default role having a privilege that permits the service principal to perform at least one action on the resource, wherein the service principal is an identity created for an application to access the resource in the cloud service;
  determine bare minimum permissions needed to perform past actions on the resource;
  find one or more least-privilege roles that cover the bare minimum permissions; and
  reassign the default role to the one or more least-privilege roles.

16. The device of claim 15, wherein the processor is further configured to perform actions that:
compare each action in a first role with each action in a second role, wherein the action comparison is based on a priority ordering of a type associated with each action; and
rank each action in the first role with each action in the second role based on the action type priority ordering.

17. The device of claim 16, wherein the processor is further configured to perform actions that:
calculate a score for the first role based on a position of each action in the first role in the action type priority ordering; and
calculate a score for the second role based on a position of each action in the second role in the action type priority ordering.

18. The device of claim 17, wherein the processor is further configured to to perform actions that:
sort the first role and the second role in a least-privilege order based on the score for the first role and the score for the second role.

19. The device of claim 15, wherein the processor is further configured to perform actions that:
apply the one or more least-privilege roles to a group of resources within the subscription.

20. The device of claim 15, wherein the processor is further configured to perform actions that:
apply the one or more least-privilege roles to a scope common to the actions performed on the resources within the subscription.

* * * * *